P. S. SMITH.
AUTOMATIC BOX COVERING MACHINE.
APPLICATION FILED JULY 9, 1903.
912,745.
Patented Feb. 16, 1909.
7 SHEETS—SHEET 6.
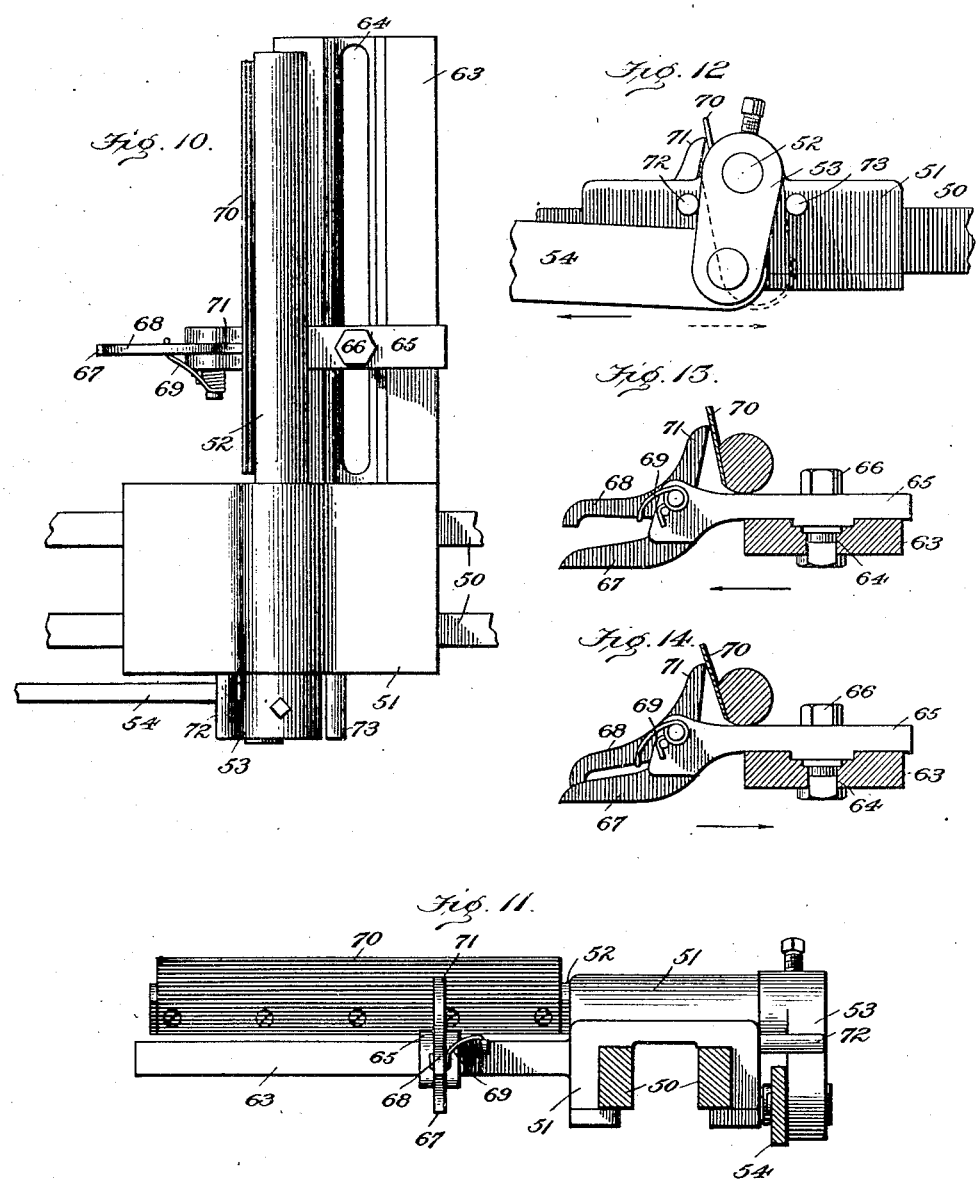
Witnesses
Edwin L. Bradford
John J. McCarthy
Inventor
Philip S. Smith
By J. Granville Meyer
Attorneys

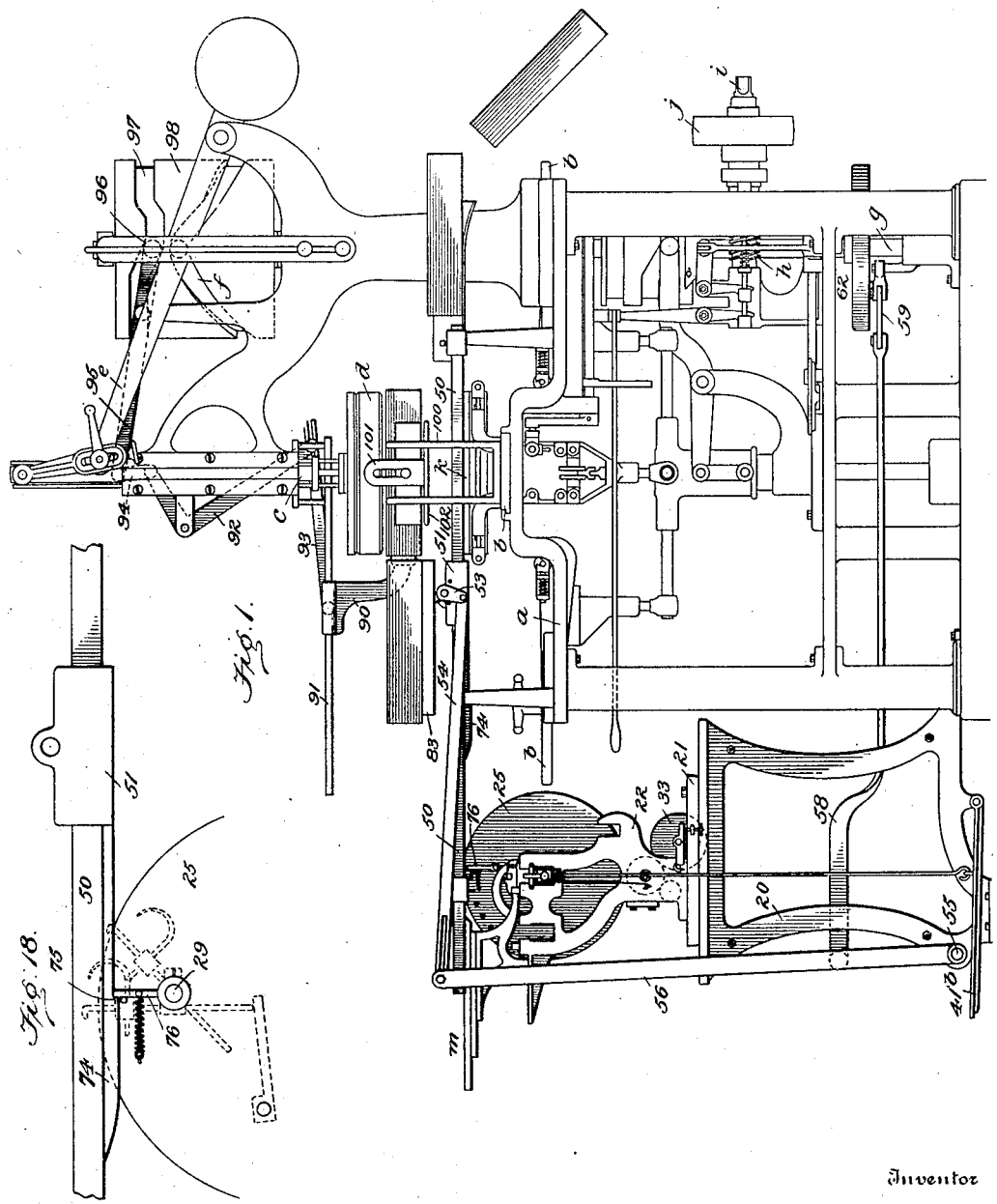

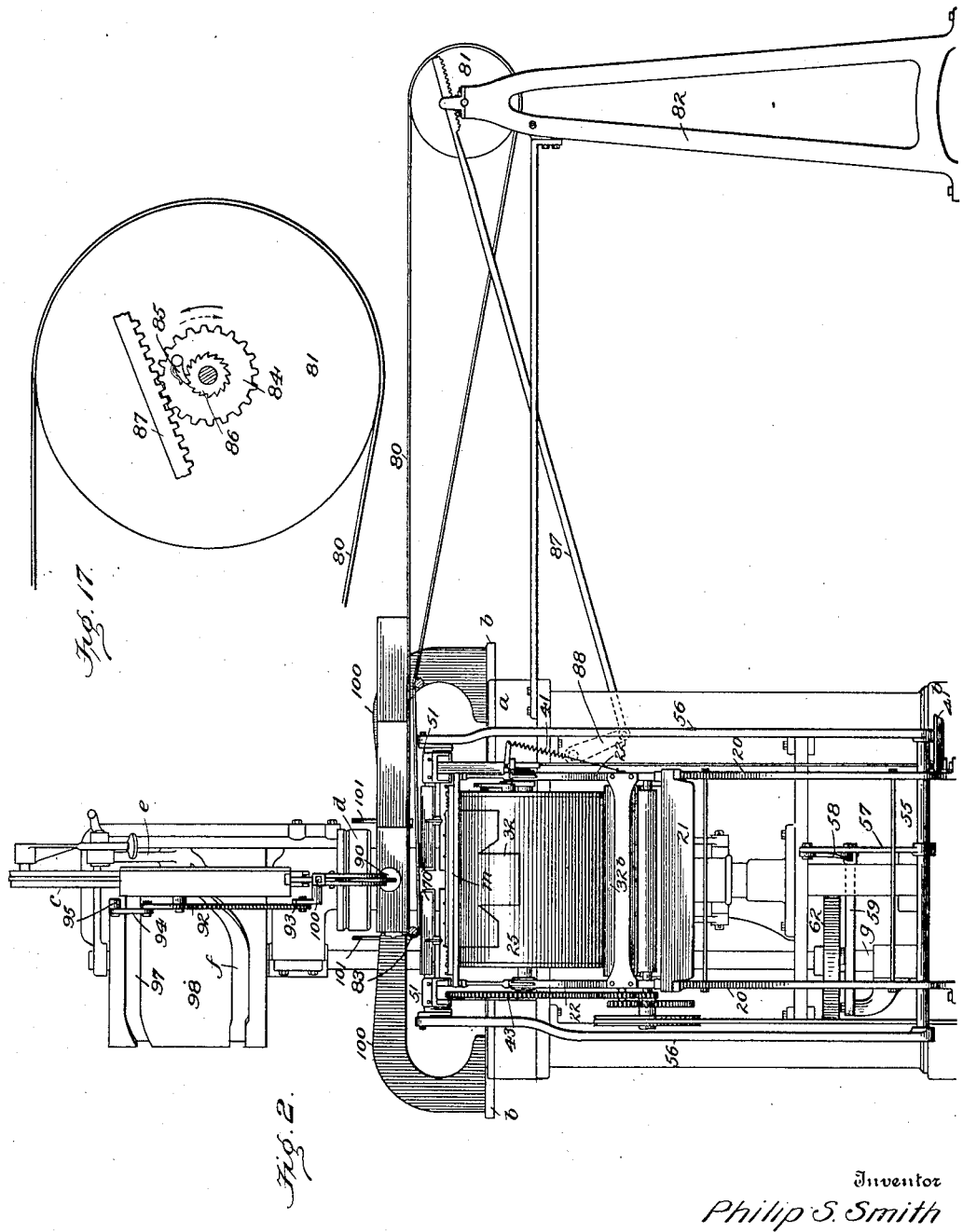

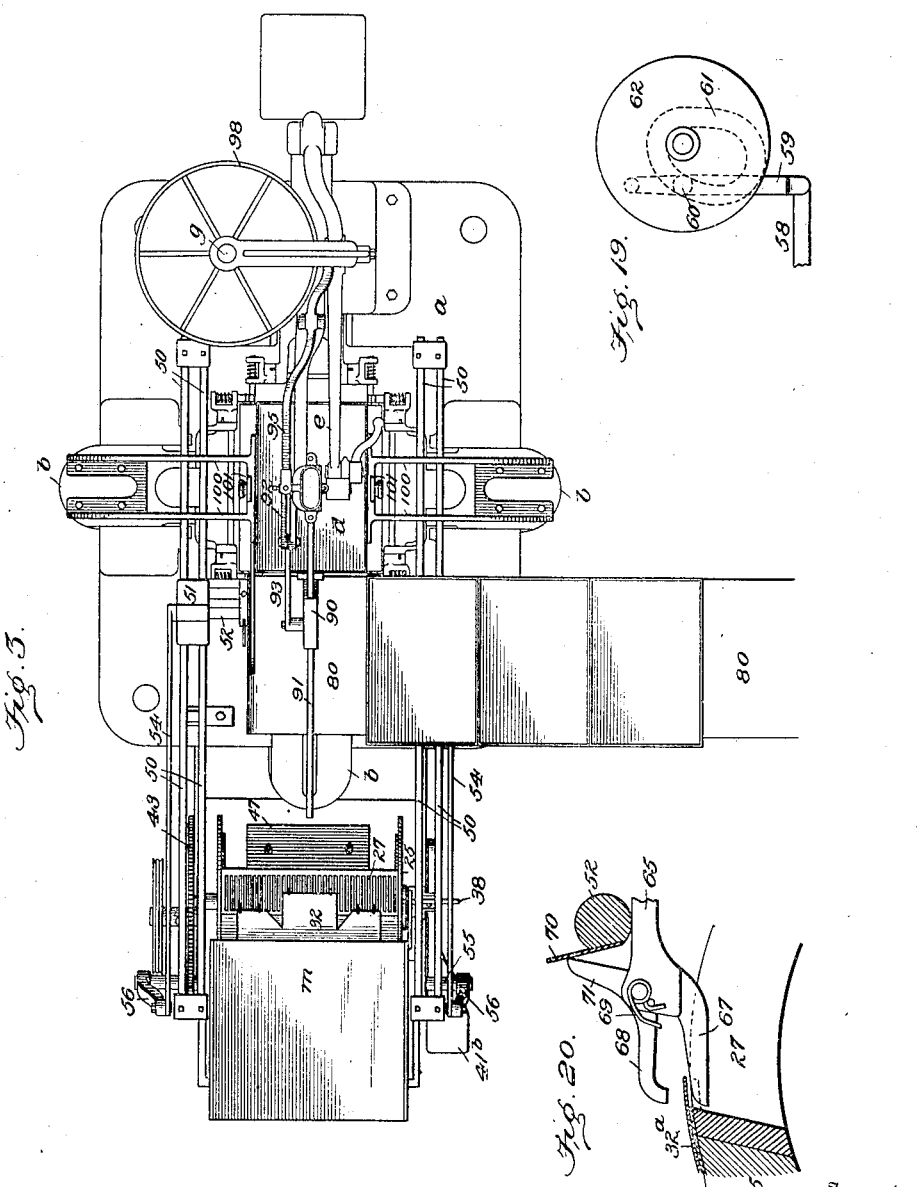

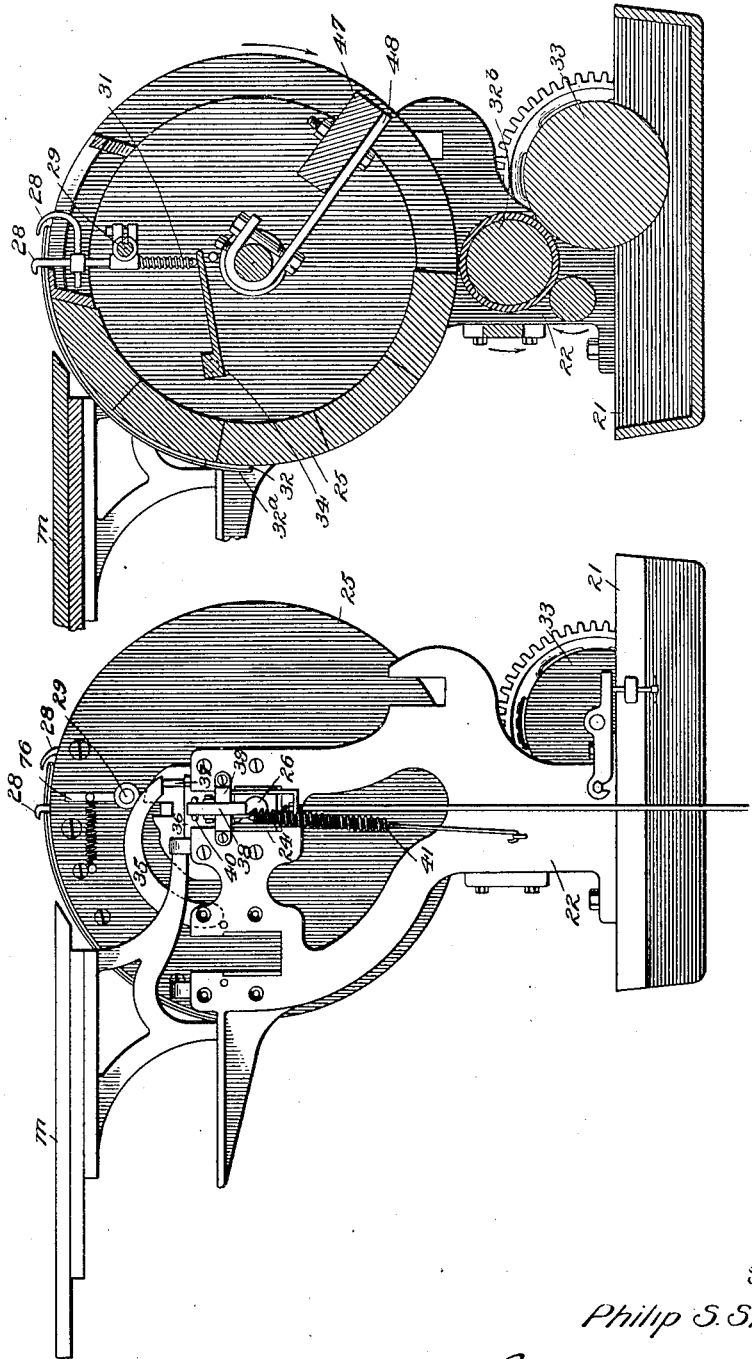

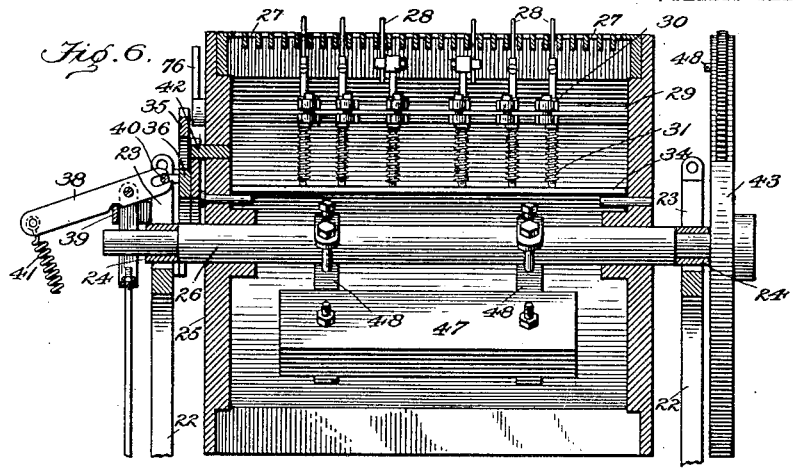
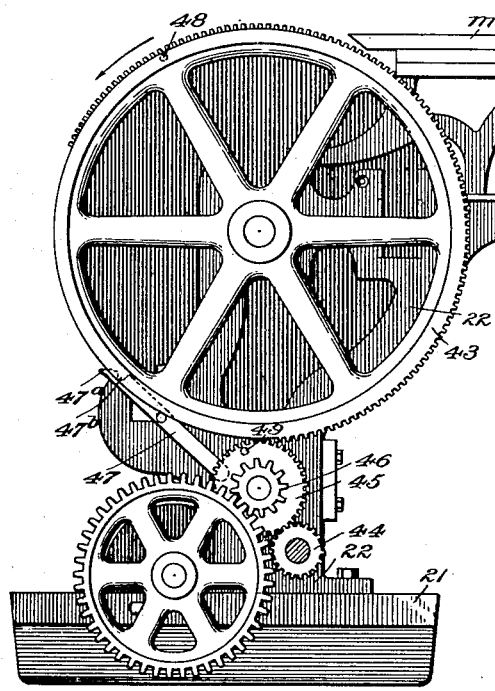
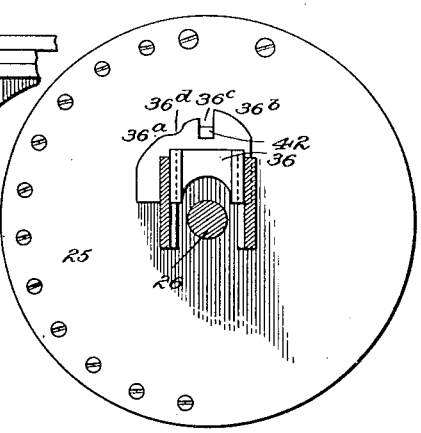
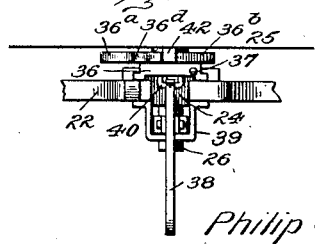

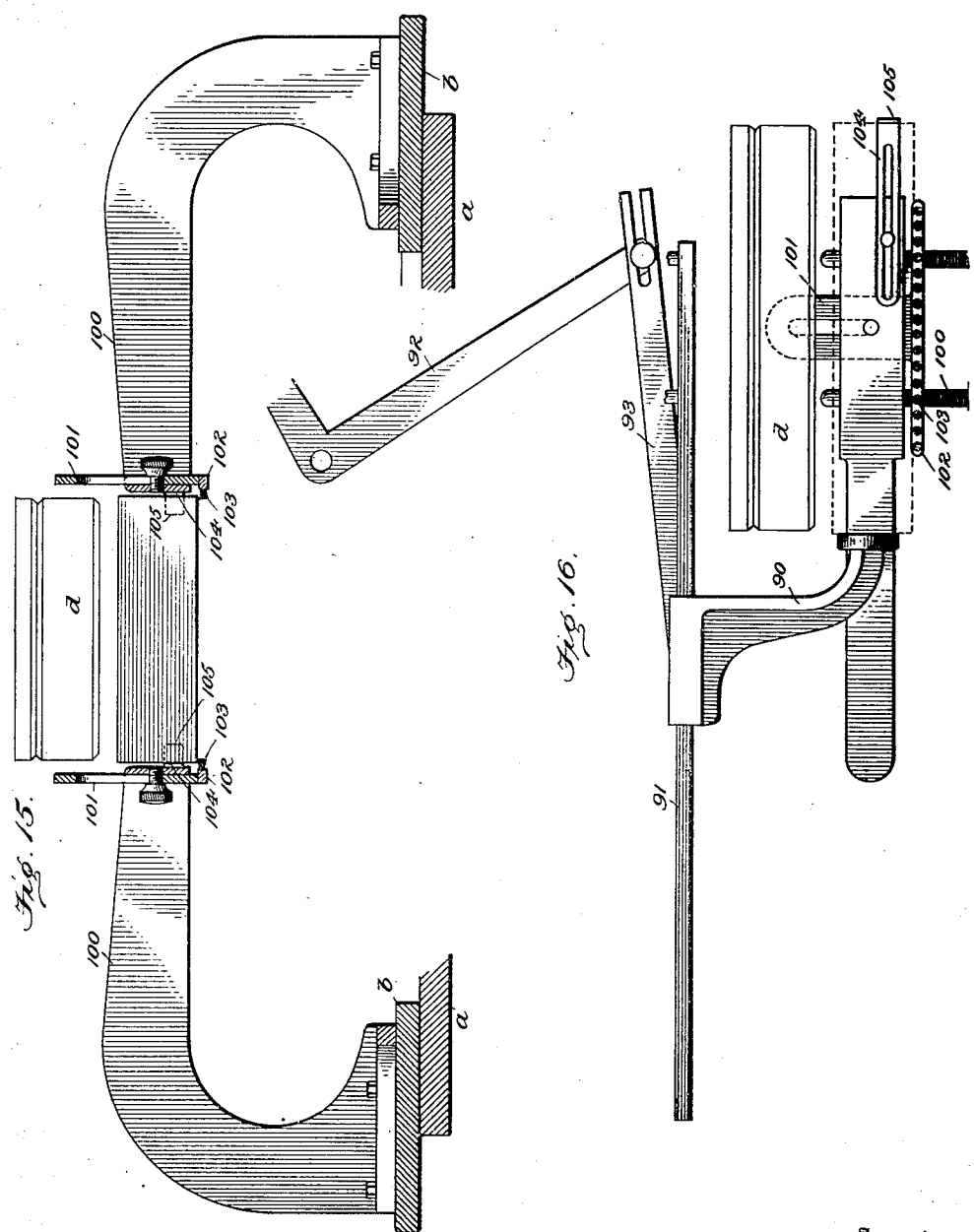

UNITED STATES PATENT OFFICE.

PHILIP S. SMITH, OF PHILADELPHIA, PENNSYLVANIA.

AUTOMATIC BOX-COVERING MACHINE.

No. 912,745.  Specification of Letters Patent.  Patented Feb. 16, 1909.

Application filed July 9, 1903. Serial No. 164,787.

*To all whom it may concern:*

Be it known that I, PHILIP S. SMITH, a citizen of the United States, residing at Philadelphia, in the county of Philadelphia and State of Pennsylvania, have invented new and useful Improvements in Automatic Box-Covering Machines, of which the following is a specification.

This invention relates to automatic blank gumming and box covering machines and is in the nature of an improvement upon the machine patented to me on the 14th day of January, 1902, No. 691,329.

In the machine forming the subject matter of my before mentioned Letters-Patent, adhesive material is first applied to the covering blank, the box is then centered upon the blank, and the box with its blank is then placed upon the plunger of the box covering machine, in position to be carried through the machine, these operations being performed by hand.

In the machine forming the subject matter of the present application the operation of applying the adhesive material to the blank and the feeding of the blank and the box to the machine, are performed automatically.

The objects of this invention then, are to provide means for applying adhesive material to one face of a covering blank; means for automatically transferring the covering blank from the adhesive applying means to a box covering machine, and means for automatically feeding a box to be covered in position beneath the plunger of the box covering machine; the said transferring and box feeding mechanisms being automatically actuated through suitable connections with operating parts of the box covering machine, in such manner that they will operate in timed relation one with the other.

Briefly and generally stated, the invention comprises novel means for applying adhesive material to the entire surface of a covering blank, said means comprising essentially a rotary drum or cylinder having suitable gripping devices to engage and support a covering blank thereon; means actuated from the driving shaft of the box covering machine for transferring the blank from the said drum or cylinder to the covering mechanism in position beneath the plunger, thereof; means for feeding the boxes in position to be moved beneath the plunger of the box covering machine, said means being actuated from a part of the covering devices of said machine; and means for automatically feeding the boxes, one by one, beneath the said plunger, said last named means being also actuated from a part of the box covering machine.

In order to enable others to clearly understand, make and use my said invention I will now proceed to describe the same in detail reference being made for this purpose to the accompanying drawings, wherein:—

Figure 1 is a side elevation of a complete automatic blank gumming and box covering machine constructed according to the present invention. Fig. 2 is an end elevation of the same. Fig. 3 is a plan view. Fig. 4 is an enlarged side elevation of the blank gumming mechanism shown detached from the covering machine. Fig. 5 is a transverse sectional view of the same. Fig. 6 is a longitudinal sectional view of the gumming mechanism showing the blank gripping fingers. Fig. 7 is a view of the gearing for operating the blank gumming mechanism, said view looking at the opposite side of the machine from that illustrated in Fig. 4. Figs. 8 and 9 are detail views of parts of the gumming mechanism. Fig. 10 is a plan view of one-half of the slide or carriage constituting a part of the transferring mechanism for the covering blank. Fig. 11 is a front elevation of the same, the track upon which the slide or carriage moves being shown in section. Fig. 12 is a side elevation of the operating means for the gripping fingers of the transferring mechanism. Figs. 13 and 14 are detail side elevations of the gripper fingers of the gumming mechanism, said views showing the fingers in open and closed positions respectively. Fig. 15 is a view in end elevation showing the means for supporting the box beneath the plunger, the latter being shown elevated above the box and in position to enter the same on its descent. Fig. 16 is a side elevation of the box feeding means. Fig. 17 is an enlarged detail view of the rack and pinion mechanism for operating the box conveying belt, Fig. 18 is an enlarged detail side elevation of a part of the gumming mechanism and the slide or carriage of the transferring means, the view showing the means for tilting the gripper fingers of the gumming mechanism. Fig. 19 is a face view of the cam that imparts motion to the arms which actuate the transferring means. Fig. 20, is a detail view partly in section of one of the gripper fingers.

As I have elected to show my improvements as applied to a box covering machine of the type illustrated in my former Letters Patent No. 691,329, I will first describe in a brief way, the several parts of said machine with which the present improvements coöperate and through which they are actuated, and while I have illustrated many of the details of said patented machine, I do not deem it necessary to again describe the same except where certain parts coöperate with the improvements.

Referring first to Fig. 1, the letter $a$, designates the table of the machine which supports the four adjustable slides $b$, carrying the various covering devices, comprising the four sets of covering rollers, end turn-in wings, edge tuck-in fingers and presser blocks, all of which are fully set forth and described in my aforesaid patent, and which operate to completely apply the covering blank to the box. The letter $c$ designates the vertically reciprocating plunger carrying the two-part form block $d$, said plunger being operated by the lever $e$, which is actuated by the cam $f$, mounted upon the main shaft $g$, said shaft receiving its rotary motion through the worm gear $h$, upon the power shaft $i$, the said latter named shaft being provided with a driving pulley $j$. The machine is provided with a platen $k$, as in my prior patent, and upon which platen the covering blank is deposited by the novel transferring mechanism forming a part of this invention and which will presently be described.

According to the present invention the covering blanks are first fed one by one, by hand, to the glue applying mechanism which applies glue to one face thereof, and are then automatically transferred from the said glue applying mechanism to the box covering machine and deposited upon the platen thereof in position to be engaged by the box as it is brought down by the form block which is operated by the plunger. The box and its blank are then carried through the box-covering machine and the blank affixed to the sides and ends of the box in precisely the same manner as set forth in my said prior patent, the finished box according to the present machine being ejected by the blank transferring means during the operation of the latter in depositing a gummed blank upon the platen.

I will first describe the blank gumming mechanism; then the means for tranferring the gummed blanks to the box covering machine, and then the means for feeding the boxes beneath the form-block and for supporting them in position to be entered by said form block on its descent toward the covering devices.

*Blank gumming mechanism.*—Mounted on suitable supports 20, is a glue vessel or pan 21, to each side of which is secured a frame 22. In each frame 22 is a slot 23, in which slides a journal block 24. (See Fig. 6). A drum 25 has its shaft 26 journaled in the blocks 24, and is thus rotatably supported in the frames, and readily removable therefrom when desired by reason of the blocks 24 being raisable in the slots. A portion of the drum has a series of slots 27, through which project radially, a number of blank clamping fingers 28, having hooked extremities that tend to engage the surface of the drum beyond the slotted portion. A rod 29 extends from one end of the drum to the other, on which slide a number of heads 30. In an aperture in each of these heads slides one of the fingers 28; and a coil spring 31 on the finger between the block and its enlarged lower end, serves to normally force the hooked ends of each finger against the drum. A form or templet 32, of the exact outline of the blank to be gummed, composed of card-board or the like, is pasted or otherwise secured to the drum, and upon this form the cover blank $32^a$, to be gummed is placed, so that one end margin will be engaged by the hooked fingers to hold the same upon the drum during the gumming operation. A gum applying roller $32^b$ is rotatably supported below the drum so that it will just clear the surface of the drum, but will engage the blank secured by the fingers 28, to the form 32, and thus gum the blank when the drum is rotated. A roller 33 serves to take up the adhesive contained in the pan 21, and coat the roller $32^b$.

In order to raise the fingers 28 from the drum to permit the placing of the blank on the form 32, and to retain them raised, I provide a rock-plate 34, pivoted at its ends in the heads of the drum, and to one of the pivots outside of the drum is secured a crank 35. A plate 36 is slidable vertically in the frame 22, and carries a stop pin 37, that engages the extremity of the crank 35. A lever 38 is fulcrumed at an intermediate part of a cleat 39, that is secured to the frame 22, and has one portion slotted and engaging a curved pin 40, secured to the plate 36. A coil spring 41 connects the other end of the lever 38 with the frame 22, and tends to retain the lever with the plate in its elevated position. The lever 38, is connected between its fulcrum and the slotted end with a suitable operating lever or treadle $41^b$, pivoted to the lower part of the gumming machine. These several parts are so arranged that, the spring 41 holding the plate elevated, the pin 37 on the latter will so rock the crank 35, and plate 34, as to cause the latter plate to retain the fingers 28 raised from the drum; the tension of the spring 39 being sufficient to overcome that of the springs on the several fingers. The plate 36 has on its upper edge two cam faces $36^a$ and $36^b$, between which is a notch $36^c$ and a depression $36^d$, the purpose of which will presently appear. A lug 42, on the head of the drum normally extends into this notch, and thereby prevents the drum from rotating, but on the treadle being depressed, the plate 35 will be lowered so that the lug 42 is clear of both walls of the notch, and the drum is free to be rotated, by any preferred means. If rotated clockwise, it will be readily seen, that since the lug 42, and crank 35, travel with the drum, upon the treadle being released and the plate 36, raised, the lug will not now reënter the notch, but will slide over the cam face 36$^b$; also, that the end of the crank 35 will have passed away from the pin 37, and hence the fingers will be tightly clamped on the blank by their individual springs. When the blank gripped by the fingers reaches the lower path of the drum, the blank will wipe against the gumming roller, 32$^b$, and receive a coating of the adhesive. And as the drum approaches the end of a complete revolution, the lug 42 will first engage the cam face 36$^a$, and then enter the depression 36$^d$ which constitutes a preliminary stop, thus temporarily arresting the rotation of the drum at this point. The remainder of the revolution will be completed by means of the blank transferring device presently to be described, and during this last movement the lug will cause the plate 36, to move downwards until at the end of the revolution, the lug comes opposite the notch 36$^c$, when the spring 39, will again elevate the plate with the lug lying in the notch. The wall of the cam 36$^b$ forming also a wall of the notch, is made higher than the opposite wall, thus constituting an abutment for the lug 42 preventing the drum moving after the lug registers with the notch. This latter elevation of the plate 36 will also cause the pin 37, on the plate to strike the crank 35, and raise the latter, which, as above set forth, will raise the fingers from the form on the drum, and retain them in such position.

My preferred means for rotating the drum is as follows:—A mutilated gear wheel 43 is secured to the shaft of the drum. A gear 44 driven from any suitable source at a uniform speed, rotates a gear 45, and also a gear 46 secured to the gumming roller. When the drum is in the locked position, as shown in Figs. 4 and 5, the toothless portion of the gear 43 is adjacent the gear 45, and the rotation of the latter does not affect the mutilated gear. But when, by the depression of the treadle, the drum is released and free to rotate, a weight 47 carried by arms 48, 48, that are secured to the shaft of the drum, serves to partially rotate the drum by gravity until the toothed portion of the gear 43, is in engagement with the revolving gear 44. Thereupon, the drum will continue to complete the revolution; at the end of which the toothless portion of the gear 43, will again be opposite the gear 45, and the latter will continue to revolve, without affecting the drum. In order to prevent too rapid rotation of the drum by the weight which would bring the teeth on the gear 45, into engagement with the gear 43 with a shock that might strip the gear teeth, I arrange a lever 47 suitably pivoted on the frame, having a beveled end 47$^a$, and a notch 47$^b$, adjacent; which latter will engage a stop-pin 48, on the gear 43, and will arrest the gear 43, and drum just before the teeth on the gear 43, are brought into engagement with the gear 45. But upon the continued rotation of the gear 45, a pin 49 thereon will trip the lever 47, releasing the gear 45 and drum. The weight 47 will then cause the gears 43 and 45 to engage, and the drum will continue its revolution.

The operation of the hereinbefore described parts is as follows:—The covering blank is fed forward by hand from a suitable table onto the form 32, the clamping fingers being in the raised position, as before explained. Then upon the treadle being depressed the blank will be gripped to the drum by the fingers, and during the rotation of the drum the blank will be gummed as described and then returned to the upper position and arrested at the preliminary stop. Thereupon, the blank is transferred to the box covering means by suitable transferring mechanism which will now be described.

The gumming mechanism, it will be noted, is not entirely automatic, but is controlled by the operator through the treadle; the other mechanisms conducive to the production of a completely covered box, are however, entirely automatic in their operation; viz. the means for transferring the gummed blank from the gumming drum or member to the covering mechanism; the means for feeding the box to be covered to the covering mechanism; the means for applying the gummed blank to the box; and, finally the means for delivering the covered box from the machine.

Referring now particularly to Figs. 1, 2, 10 and 11, on each side of the machine are a pair of guide bars 50, extending from the covering machine to the gumming machine, on each of which slides a grip-block or carriage 51. Each of these blocks or carriages carries a rotatable shaft 52, having a crank 53, secured thereto and to each crank is pivoted a connecting rod 54. A shaft 55 is journaled near the base of the gumming machine, and to each end is secured an upright arm 56, that are pivotally connected, respectively, with the slotted ends of said rods 54. An arm 57 is secured to an intermediate part of the shaft 55, and a rod 58, connects this arm with a lever 59. On this latter named lever is a roller 60, that engages the walls of a groove 61, in a grooved disk 62, on the main shaft $g$ of the covering machine as shown in Fig. 19. The groove is so disposed as to rock the lever 59, and, through the several parts just described, cause the guide-blocks 51, 51, to reciprocate on the guides 50 between the gumming means and covering mechanism. To each of the guide-blocks is secured a plate 63, containing a slot 64; these plates extending toward each other on the guide-blocks, (see Figs. 11 to 14). A bar 65 is adjustably secured to each plate 63 by a bolt 66 passing through the bar and through the slot in the plate. The bar 65 extends beneath the shaft 52, and carries a fixed jaw 67, to which is pivoted a jaw 68, a spring 69, serving to normally keep the jaws apart. On the shaft 52, is secured a plate 70, against which an arm 71 of the movable jaw 67 is pressed by the said spring 69. Since the slot 64, is parallel with the shaft 52, when the bar 65, and jaws are adjusted in various positions along the plate 63, the arm 70, of the movable jaw, will remain in engagement with the plate 71, in these various positions. When the rods 54 are operated to move the grips or carriages 51 from the covering machine towards the gumming machine, the cranks 53, will first be rocked until they contact with the stop pins 72 on the blocks, whereupon the grip blocks will be advanced the jaws being open. But upon the reverse movement of the rods 54, the cranks 53 will be rocked in the opposite direction until they strike the pins 73 which will cause the plates 70 to close the jaws, as shown in Fig. 14. When the gripping jaws are moved to the gumming machine, at the limit of this movement, they are brought so that the now open jaws will inclose the edge of the gummed blank on the drum 25, and as soon as the rods 54 begin the return movement, the jaws will close in on the blank, suitable portions of the plate under the blank being cut away so that the plate will not be gripped also. In order to prevent the hooked fingers 28, from interfering with the transfer of the blank as it is being drawn off the drum, I provide an arm 74, secured to one of the blocks 51, which arm has a beveled extremity, and an abutment 75, that engages the end of an arm 76, secured to the shaft 29, that carries the gripper fingers 28. This abutment is so located that as soon as the rods 54, begin their return movement, the arm 74 will rock the shaft 29 and cause the gripper fingers to retreat into the drum and out of the horizontal path of movement of the blank. The gripping fingers will now carry the blank to the covering devices, and deposit it on the platen k, in position to be applied to a box. Then, after the blank has been disposed of the gripping jaws will be returned for another blank, all of which operations will be automatically controlled in timed relation with the operation of the covering devices by reason of the configuration of the grooved disk 62, on the main shaft g, of the covering machine.

It will be understood that when the arm 74, on the carriage 51, approaches the drum to take a blank, the said drum is in its preliminary stopping position, or in other words, the lug 42, is resting in the depression 36ᵈ, thus frictionally holding the drum against rotation to a completion, the grippers at the same time holding the blank. Now when the carriage starts to move toward the covering mechanism in the act of delivering a gummed blank, the abutment 75, on the arm 74, engages the end of arm 76, secured to the shaft 29, carrying the gripper fingers, and rocks said shaft to cause the fingers to retreat into the drum. This pull on the arm 76, is sufficient to complete the rotation of the drum, or in other words, to take it from its preliminary stop to its final stop where the lug 42, registers with the notch 36ᶜ, and at the same time the gripper fingers will be raised, freeing the blank, and then almost simultaneously carried down into the drum out of the path of movement of the blank. It will be seen therefore that the object of the preliminary stop which takes place as the mutilated gear runs out, is to hold the drum in position for the grippers to take the blank.

The means for conveying the boxes to be covered comprises an intermittently rotated endless belt 80, passing around an actuating drum 81, mounted on a suitable support 82, and also around a roller 83, arranged at one side of the platen, so that the boxes are delivered adjacent to the covering devices in position to be fed onto a suitable support located below the form-block of the covering machine. On the shaft of the drum 81, is loosely carried a gear 84, having a ratchet 85 pivoted thereon; which ratchet engages a ratchet gear 86 secured on the shaft of the drum 81. The gear 84 is oscillated at timed intervals by a rack-bar 87, connected to a crank arm 88, that is rocked from a suitable part of the covering machine; by which means the belt is given an intermittent movement to feed the boxes to the covering mechanism, the boxes being placed upon the belt by hand.

When the boxes are brought adjacent the covering devices they are moved in position to be entered by the form block on its descent by a feeding arm 90, that is slidable upon a rod 91, secured to the frame of the machine. A bell crank 92 pivoted on the frame is connected with the arm 90, by a link 93, having one end slotted for adjustment. The other arm of the bell-crank is connected by a link 94 with one end of a lever 95, that is pivoted on the frame. The other end of this lever 95, has a friction roller 96, that engages the walls of a groove 97 in a drum 98, on the main shaft $g$. This groove 97 is so designed that the arm 90 is given an intermittent reciprocation and thereby feeds the boxes one by one onto a support arranged below the form-block, said arm being actuated at the proper stage in the covering operation.

My preferred means for supporting the boxes after they have been fed from the conveyer-belt 80, comprises a pair of bracket arms 100, 100, (see Fig. 15) secured to the slides $b$, on the table $a$, the ends of which arms are arranged on opposite sides of the path of movement of the box to be covered. To the end of each bracket arm is adjustably secured a slotted arm 101, clamped to the bracket arm 100, by a screw passing through the slot and tapped into the said arm 100. At the lower end of each arm 101, is a head 102, that carries on the face opposite the other arm, a flexible member 103, of sufficient rigidity to support the box to be covered, yet pliable enough to bend and permit the box to be forced down during the descent of the plunger, past the members 103. These flexible members I preferably make of bristles, the heads constituting brushes. The arm 90, previously described, moves the boxes from the conveyer belt, into the space between the ends of the arms 100, which will then be supported by the brushes 103. An adjustable stop composed of a slotted bar 104 is secured to each arm 100, by a screw passing through the slotted portion of the bar; which bar has a bent end portion 105 that acts to stop the box when it has been moved into the proper position on the brushes 103. Thereupon the plunger descends causing the form-block to enter the box and carry it down past the supporting brushes, onto the covering blank which is resting upon the platen and thence down through the covering devices; all of which latter parts are fully set forth in my said Letters Patent. Upon the return of the platen to its uppermost position, the succeeding movement of the gripper jaws and blocks in the act of transferring another gummed blank upon the platen, the block will strike the just covered box that has been stripped from the form and force the box off on the delivery slide, where it will be advanced by each succeeding box. The flexible members or bristles 103, not only serve as a support for the box, but they serve to strip the box from the form-block on its return stroke. The edges of the bristles are projected slightly into the path of the form-block and serve to hold the boxes tightly on the form as it descends toward the platen, which is an important feature in order to secure accurate registration, and said bristles being so projected will engage the opposite edges of the box on the upstroke of the plunger and strip it from the form block allowing it to remain on the platen from where it will be pushed off by the blank transferring device or carriage.

The operation of the complete apparatus is as follows: The blank is taken from the table $m$, and placed upon the form on the drum 25, then the treadle is depressed, which will cause the gripper fingers on the drum to clamp the blank on the drum, and the drum will rotate, gumming the blank, and returning it to its preliminary stopping position with the fingers down. This part of the box covering operation, it will be noted, is not entirely automatic, but is governed by the operator. But the succeeding stages are controlled entirely independent of the operator. The gummed blank remains on the drum 25, until the gripping fingers are moved over and grip the blank by the two pairs of jaws, causing the gripper fingers to retreat into the drum, and then transfer the gummed blank to the platen, where it is deposited, the gripping jaws remaining in this position until the form-block and platen is carried down through the covering devices to cover box; when they will return to the gumming drum for another gummed blank. Just as soon as the transferring jaws and connected parts have moved beyond the gumming drum, the operator puts another blank on the form, and repeats the gumming operation by depressing the treadle, and then awaits the transferring of this last gummed blank. At about the same time that the gummed blank is being transferred onto the platen, a box to be covered is moved onto the supporting brushes by the arm 93, which immediately retreats and permits the conveyer belt to advance another box in position to be moved off onto the brush support. Thereupon the plunger and form-block descend the latter entering the box and carrying it down through the brushes, and onto the gummed blank on the platen; and thence further down into engagement with the various covering devices. As just mentioned, as soon as the plunger is carried down, the transferring jaws return to the gumming device, to transfer another blank. When the box has been covered, the platen returns to its former uppermost position, and the stripping mechanism engages the box, as the plunger and form-block continue to ascend, and thus strip the box from the form-block, leaving it on the platen. The succeeding operation of transferring a gummed blank onto the platen will move the covered box off the platen onto the delivery slide.

While I have shown and described certain parts of the present machine coupled up and coöperating with a certain type of box covering machine, I do not wish to be understood as limiting myself to this particular arrangement for it will be obvious that these parts may be employed in other connections without departing from the spirit of the invention as expressed in the appended claims. Likewise it will be obvious that the gumming mechanism herein shown and described, as well as the blank feeding; box supporting; and the box feeding mechanisms, may be applied to other covering machines than the one herein set forth, or may be employed in other combinations, and still remain within the scope of the following claims.

I claim—

1. In an organized machine for gumming a covering blank and for affixing said blank to a box, the combination with gumming means, of box covering mechanism embodying a form block, a coöperating platen and instrumentalities for affixing the covering blank to the bottom, sides and ends of a box, and means movable back and forth between the gumming means and covering mechanism for transferring the gummed blank from the gumming means to and depositing it upon the platen of the covering mechanism, said transferring means being operatively connected to and actuated from a movable part of the machine and operating in timed relation therewith to deliver the gummed blanks at predetermined intervals.

2. In an organized machine for gumming a covering blank and for affixing said blank to a box, the combination with gumming means, of box covering mechanism embodying a reciprocatory form block, a coöperating platen and instrumentalities for affixing the blank to the bottom, sides and ends of a box, means movable back and forth between the gumming means and the covering mechanism for transferring the gummed blank from the gumming means to the covering mechanism, said transferring means being operatively connected to and actuated from a movable part of the machine and operating in timed relation therewith to deliver the gummed blanks at predetermined intervals, and means also operatively connected to a movable part of the machine for delivering the boxes to the covering mechanism in position to have the covering blank applied thereto.

3. In an organized machine for gumming a covering blank and for affixing said blank to a box, the combination with gumming means, of box covering mechanism embodying a vertically movable support for the box and cover applying instrumentalities for affixing the covering blank to the sides and ends of the box, and means movable back and forth between the gumming means and covering mechanism for transferring the gummed blank from the gumming means to the covering mechanism, said transferring means being operatively connected to and actuated from a movable part of the covering mechanism and operating in timed relation therewith to deliver the gummed blanks at predetermined intervals.

4. In an automatic box covering machine, the combination with box covering mechanism embodying in its construction a reciprocatory form-block and a coöperating platen, of blank gumming means, and a transferring device movable back and forth between the covering mechanism and gumming means for transferring the gummed blank from the gumming means and for depositing it upon the platen said transferring means being connected to a movable part of the covering mechanism and operating in timed relation to the movements of the form block.

5. In an automatic box covering machine, the combination with box covering mechanism, embodying a vertically reciprocatory form-block and a coöperating platen, of means for applying adhesive material to one surface of a covering blank, automatic means movable back and forth between the covering mechanism and adhesive applying means for transferring the blank from the adhesive applying means and depositing it upon the platen, and connecting means between the main shaft of the box covering mechanism and said transferring means whereby these parts are operated in predetermined sequence.

6. In an automatic box covering machine, the combination with box covering mechanism, including a reciprocatory form-block and coöperating platen, of means for applying adhesive material to a covering blank, transferring means arranged to transfer the gummed blank from the adhesive applying means to the platen, means operatively connected to the main shaft of the covering mechanism for actuating the transferring means to cause the latter to move back and forth between the covering mechanism and adhesive applying means in timed relation to the movements of the form-block, and means for temporarily arresting the movement of the transferring means immediately it has deposited a blank on the platen and while the covering mechanism is operating upon a box.

7. The combination with the gumming mechanism and the platen, of transferring means comprising a guide-way, a block slidable on the guide-way between the gumming mechanism and the platen, laterally adjustable gripping jaws on the block arranged to grip a blank, springs acting to hold the jaws normally open, means for reciprocating the block, and means actuated by the reciprocating means to hold the jaws closed during their movement from the gumming means to the platen.

8. The combination with the gumming mechanism and the platen, of transferring means comprising a guide-way, a block slidable on the guide-way between the platen and the gumming mechanism, a shaft journaled on the block, a forwardly projecting jaw secured to the block, a second forwardly projecting jaw pivoted on the said first named jaw, means on the shaft arranged to engage the movable jaw and thereby close the jaws when the shaft is rocked, a crank on said shaft, a rod connected with the crank and being arranged when moved in one direction, to first rock the shaft and open the jaws and then slide the block towards the gumming mechanism, and when moved in the opposite direction to first close the jaws and then slide the block to the platen.

9. The combination with the gumming mechanism and the platen, of transferring means comprising a guide-way, a block slidable on the guide-way between the platen and the gumming mechanism, a shaft journaled on the block transverse to the guide way, a forwardly projecting jaw member secured to the block and adjustable thereon transverse to the guide-way, a similar jaw pivoted on said jaw member, a plate secured to said shaft and arranged to engage the movable jaw in the various positions of adjustment of said second named jaw member; a crank on said shaft, a spring tending to separate the jaws, and a rod connected with the crank and arranged to first rock the shaft and operate the jaws and then slide the block.

10. In an automatic box covering-machine, the combination with box-covering means, including a vertically reciprocatory form block and a platen, of a gumming means, a transferring means for transferring a gummed blank from the gumming means to the platen, said means comprising a pair of guide-ways, a block slidable on each guide-way, a pair of jaws on each block, a shaft, an upright arm on each end of the shaft, a connecting rod between the end of each arm and one of the devices, and operating means between the covering means and the said shaft arranged to operate the slide-blocks and jaws to grip a gummed blank and transfer it to and deposit it upon the platen in timed relation with the box-covering mechanism.

11. In a box covering machine, the combination with the box covering mechanism, including a platen, of a gumming mechanism, including a blank support and gripping means for retaining the blank on the support, transferring means arranged to convey the gummed blank from the said blank support to the platen, and means on the transferring means arranged to shift the said gripping means out of the path of movement of the blank being conveyed to the platen.

12. In a box covering machine, the combination with the covering mechanism, including a plate, of a gumming mechanism including a blank support having a series of slots therein, gripper fingers projecting normally through the slots and arranged to retain the blank on the support means for raising the fingers from the support to free the blank, transferring means arranged to convey the gummed blank from the said support to the platen, and means on the transferring means arranged to cause the said gripper fingers to retreat into the support through the slots when the gummed blank is being transferred to the platen.

13. In a box covering machine, the combination with the covering mechanism including a platen, of a gumming mechanism including a rotatable drum, gripper fingers arranged to retain the blank on the drum while being gummed, means for gumming the blank on the rotation of the drum, means for raising the fingers from the drum, transferring means arranged to convey the gummed blank from the said support to the platen, and means on the transferring means arranged to cause the gripper fingers to retreat out of the path of the blank being conveyed.

14. In a box covering machine, the combination with covering mechanism, of a raised form for supporting a blank said form corresponding in shape and size to the shape and size of the blank, oscillatory gripper fingers for holding the blank on said form, means for gumming the blank while it is so held, means for transferring the gummed blank from its support to the covering mechanism, and means for oscillating the gripper fingers to take them out of the path of movement of the transferring means.

15. In a box covering machine, the combination with covering mechanism, of a raised form for supporting a blank said form corresponding in shape and size to the shape and size of the blank, oscillatory gripper fingers for holding the blank on said form, means for gumming the blank while it is so held, means for transferring the gummed blank from its support to the covering mechanism, and means for oscillating the gripper fingers to take them out of the path of movement of the transferring means, said finger oscillating means being actuated by the transferring means.

16. In a box covering machine, the combination with covering means, of a form for supporting a blank, a shaft secured beneath the form, heads on the shaft, a gripper finger carried by each head and movable therein to grip a blank on the form, transferring means arranged to convey the blank from the form to the covering mechanism, and means actuated by the transferring means for oscillating the shaft and fingers to move the latter out of the path of movement of the gummed blank being transferred to the covering mechanism.

17. In a box covering machine, the combination with the covering means including a platen and a plunger normally above the platen, of adjustable means for supporting a box between the plunger and the platen said means having flexible members arranged to permit the plunger to force the box through the same onto the platen.

18. In a box covering machine, the combination with the covering means including a platen and a plunger normally located above the platen, of means for supporting a box between the plunger and the platen, said means including vertically adjustable brushes extending into the path of movement of the box when advanced by the plunger onto the platen.

19. In a box covering machine the combination with the covering mechanism including a platen and a plunger normally held above the plunger, of a box support having adjustable members located on opposite sides of the path of movement of the plunger, and a brush member adjustably secured to each of said members and arranged to yieldably support the box and permit the plunger to force the box past the brushes down onto the platen.

20. In a box covering machine, the combination with box covering mechanism embodying a reciprocatory plunger, carrying a form-block, of an adjustable box-support located on opposite sides of the path of movement of said form-block, and means actuated by the plunger for feeding a box onto said support.

21. In a box covering machine, the combination with box covering mechanism, embodying a reciprocatory plunger carrying a form block, of box supports located on opposite sides of the path of movement of said form-block, said supports having portions projecting in the path of movement of the form block to constitute supports for the bottom of the box on two sides and means for feeding a box onto said supports, said means being operatively connected to and actuated by the plunger operating means.

22. In a box covering machine, the combination with the covering means including a platen and a vertically reciprocatory plunger, of a box support located between the platen and the plunger when in their normal positions, means for feeding a box to a position opposite the said support, and means operatively connected to the said plunger for moving the box from the feeding means onto the said support in line to be entered by the plunger.

23. In a box covering machine, the combination with the covering means, including the platen and a vertically reciprocatory plunger, of a box support located between the platen and the plunger when in their normal positions, an endless belt arranged to feed boxes to a position opposite the box support, and a reciprocating arm operatively connected to the plunger arranged to move the boxes from the belt onto the support.

24. In a box covering machine, the combination with the covering means, including the platen and a vertically reciprocatory plunger, of a box support located between the platen and the plunger when in their normal positions, an endless belt arranged to feed boxes to a position opposite the box support, means for advancing the belt intermittently in timed relation to the operation of the covering means, and an arm operatively connected to the plunger arranged to move a box from the belt onto the support in timed relation with the movement of the plunger.

25. The combination in a box covering machine, with the covering means including a platen and a vertically reciprocatory plunger normally located above the platen, of means for conveying a gummed cover blank to and depositing it on the platen, means for supporting a box elevated between the platen and plunger in position to be entered by the latter, means for causing the box after it has been covered to be deposited on the platen, and means on the cover conveying means arranged to engage and force the covered box off from the platen when conveying another gummed blank onto the platen.

26. In an organized machine for gumming box covering blanks and applying said blanks to a box shell, the combination with box covering instrumentalities including a vertically reciprocatory form block and a coöperating platen, of a blank support having an outline corresponding in shape and size to the outline of the covering blank, means for holding said blank on the support, means for applying adhesive to the exposed face of said blank, and transferring means for conveying the blank from its support, after it has received the adhesive, to the platen of the box covering instrumentalities.

27. In an organized machine for gumming box covering blanks and applying said blanks to a box shell, the combination with box covering instrumentalities including a vertically reciprocatory form block and a coöperating platen, of a rotatable support carrying a raised form having an outline corresponding in shape and size to the outline of the covering blank, means for holding the blank on the form, means for rotating the support, means for applying adhesive to the exposed face of the blank during the rotation of the support, and transferring means for conveying the gummed blank from the form to and depositing it upon the platen of the box covering instrumentalities.

28. In an organized machine for gumming box covering blanks and applying said blanks to a box shell, the combination with box covering instrumentalities including a vertically reciprocatory form-block and a coöperating platen, of a rotatable support carrying a raised form having an outline corresponding in shape and size to the outline of the covering blank, grippers for holding the blank on the support, means for rotating the support, means for applying adhesive to the exposed face of the blank during the rotation of the said support, a transferring device for conveying the gummed blanks from the form and depositing them upon the platen of the box covering instrumentalities, and means on the transferring device for throwing the grippers out of the path of movement of the transferring means.

29. In an organized machine for gumming box covering blanks and applying said blanks to a box shell, the combination with box covering instrumentalities including a vertically reciprocatory form block and a coöperating platen, of a rotatable support carrying a raised form having an outline corresponding in shape and size to the outline of the covering blank, grippers for holding the blank on the form, means for rotating the support, means for applying adhesive to the exposed face of the blank during its rotation, means operated by the rotation of the support for raising the grippers to free the blank after the latter has been gummed, and a transferring device for conveying the gummed blank to and depositing it upon the platen of the box covering instrumentalities.

30. In an organized machine for gumming box covering blanks and applying said blanks to a box shell, the combination with box covering instrumentalities including a vertically reciprocatory form block and a coöperating platen, of a rotatable support carrying a raised form corresponding in shape and size to the shape and size of the covering blank, grippers for holding the blank on the form, means for applying adhesive to the exposed face of the blank during rotation, means for locking the support against rotation, manually operable means for releasing said locking means, and a transferring device for conveying the gummed blank from the form to the platen of the box covering instrumentalities.

31. In an organized machine for gumming box covering blanks and applying said blanks to a box shell, the combination with box covering instrumentalities including a vertically reciprocatory form block and a coöperating platen, of a rotatable support for the blanks to be gummed, grippers for holding the blank on the support, means for locking the support against rotation, manually operable means for releasing said locking means, means for rotating the support, a gumming roll for applying adhesive to the face of the covering blank during its rotation, and a transferring device for conveying the gummed blank to the platen of the box covering instrumentalities.

32. In an organized machine for gumming box covering blanks and applying said blanks to a box shell, the combination with box covering instrumentalities including a vertically reciprocatory form block and a coöperating platen, of a rotatable drum for supporting a blank to be gummed, gravity means for imparting a partial rotation to said drum, grippers for holding the covering blank on the drum during rotation, means for applying adhesive to the blank during its rotation, means for locking the drum against rotation after the blank has been gummed, and means for transferring the gummed blank to and depositing it upon the platen of the box covering instrumentalities.

33. In an organized machine for gumming box covering blanks and applying said blanks to a box shell, the combination with box covering instrumentalities including a vertically reciprocatory form block and a coöperating platen, of a rotatable drum for supporting a blank to be gummed, gravity means for imparting a partial rotation to said drum, gearing for completing the rotation thereof, means for applying adhesive to the blank during the rotation of the drum, and means for transferring the gummed blank from the drum to the platen.

34. In a box covering machine, the combination with box covering instrumentalities including a vertically reciprocatory plunger carrying a form-block adapted to support and carry a box through the covering mechanism, of means for feeding boxes one at a time beneath and in line with the form-block, comprising a pushing device and a bell crank lever connected at one end to the plunger and at its other end to the pushing device.

35. In a box covering machine, the combination with box covering instrumentalities including a vertically reciprocatory plunger carrying a form-block for supporting and carrying the box, of means for feeding boxes one at a time beneath and in line with the form-block, comprising a slidable pusher, a bell-crank lever connected at one end to the plunger, and a link connection between the pusher and the other end of the bell crank lever.

36. In a box covering machine, the combination with box covering instrumentalities including a vertically reciprocatory plunger carrying a form-block, of means for feeding boxes one at a time beneath and in line with the form-block, comprising a slidable pusher, a bell-crank lever connected at one end to the plunger, a link connection between the pusher and the other end of the bell crank lever, and means for regulating the extent of movement of the pusher.

37. In an organized machine of the character described and in combination, box covering mechanism embodying a form-block for supporting and carrying a box, a coöperating movable platen and cover-applying instrumentalities for affixing the covering blank to the bottom, sides and ends of a box, gumming means for completely coating one face of the covering blank with adhesive, a transferring device for carrying the gummed blank from the gumming means to and depositing it upon the platen of the covering mechanism, and operative connections between the gumming means and a movable part of the covering mechanism; whereby the parts operate in regular sequence, to first gum the blank, then transfer it over onto the platen, then cause the box-form to advance the box until its bottom contacts with the gummed face of the blank and continue on through the covering instrumentalities where the blank is applied to the sides and ends of the box and the edges turned over and affixed to the inner box walls.

38. In an organized machine for gumming a covering blank and for affixing said blank to a box, the combination with box covering mechanism embodying cover-applying instrumentalities for affixing the covering blank to the bottom, sides, and ends of a box and a movable box-form for supporting and carrying the box through the said covering instrumentalities, a blank support, means for completely coating one face of the blank with an adhesive, means for transferring the coated blank from the adhesive applying means to the covering mechanism, and operative connections between a movable part of the said mechanism and the transferring device; whereby the parts operate in regular sequence, to first gum the blank, then transfer said blank to the covering mechanism, then cause the box form to move the box onto the blank and thence through the cover-applying instrumentalities where the cover is applied to the bottom, sides and ends of the box and the edges turned over and affixed to the inner box walls.

In testimony whereof I have hereunto set my hand in presence of two subscribing witnesses.

PHILIP S. SMITH.

Witnesses:
  J. C. WILSON,
  WALTER F. HENRY.